United States Patent

[11] 3,598,468

| [72] | Inventor | Donald M. Perry<br>Rte. 2 Box 573, Gresham, Oreg. 97030 |
|---|---|---|
| [21] | Appl. No. | 7,394 |
| [22] | Filed | Feb. 2, 1970 |
| [45] | Patented | Aug. 10, 1971<br>Continuation of application Ser. No.<br>781,662, Oct. 3, 1968, now abandoned,<br>Continuation of application Ser. No.<br>274,149, Apr. 19, 1963, now abandoned. |

[54] OPTICAL SYSTEM WITH TILTED CONCAVE MIRROR AND ASTIGMATISM COMPENSATOR
8 Claims, 4 Drawing Figs.

[52] U.S. Cl. ............................................. 350/55,
350/27, 350/199, 350/204, 350/296
[51] Int. Cl. ............................................. G02b 21/04,
G02b 17/00, G02b 23/06
[50] Field of Search............. ........................ 350/55,
27—29, 199—201, 204, 293, 294, 296

[56] References Cited
UNITED STATES PATENTS

| 1,428,935 | 9/1922 | Bell | 350/55 |
|---|---|---|---|
| 1,668,015 | 5/1928 | Harris | 350/55 |
| 2,156,911 | 5/1939 | Brown | 350/27 |
| 2,661,658 | 12/1953 | Dyson | 350/199 |
| 2,672,072 | 3/1954 | Sachtleben et al | 350/166 |
| 2,867,151 | 1/1959 | Mandler | 350/10 |
| 3,180,207 | 4/1965 | Herrmann | 350/145 |

FOREIGN PATENTS

| 22,127 | /1900 | Great Britain | |
| 161,214 | 4/1921 | Great Britain | |
| 215,331 | 1/1925 | Great Britain | |
| 30,632 | 3/1885 | Germany | 350/29 |

OTHER REFERENCES

" Scientific American" Applied 198 No. 5 May 1958 pgs. 130— 132, 134, 136 960 (copy 138 cited Copy in 350/27

*Primary Examiner*—David H. Rubin
*Attorney*—Buckhorn, Blore, Klarquist & Sparkman

ABSTRACT: An optical system for a microscope includes a spherical mirror tilted a few degrees relative to the optical axis, and a plano plate having a transparent refractive portion in the path to the mirror and a reflective surface in the path from the mirror, with the plate tilted so that its refractive portion corrects astigmatism which results from tilting of the mirror. An optical system for a telescope is similar except that a right angle prism is used in place of the plano plate.

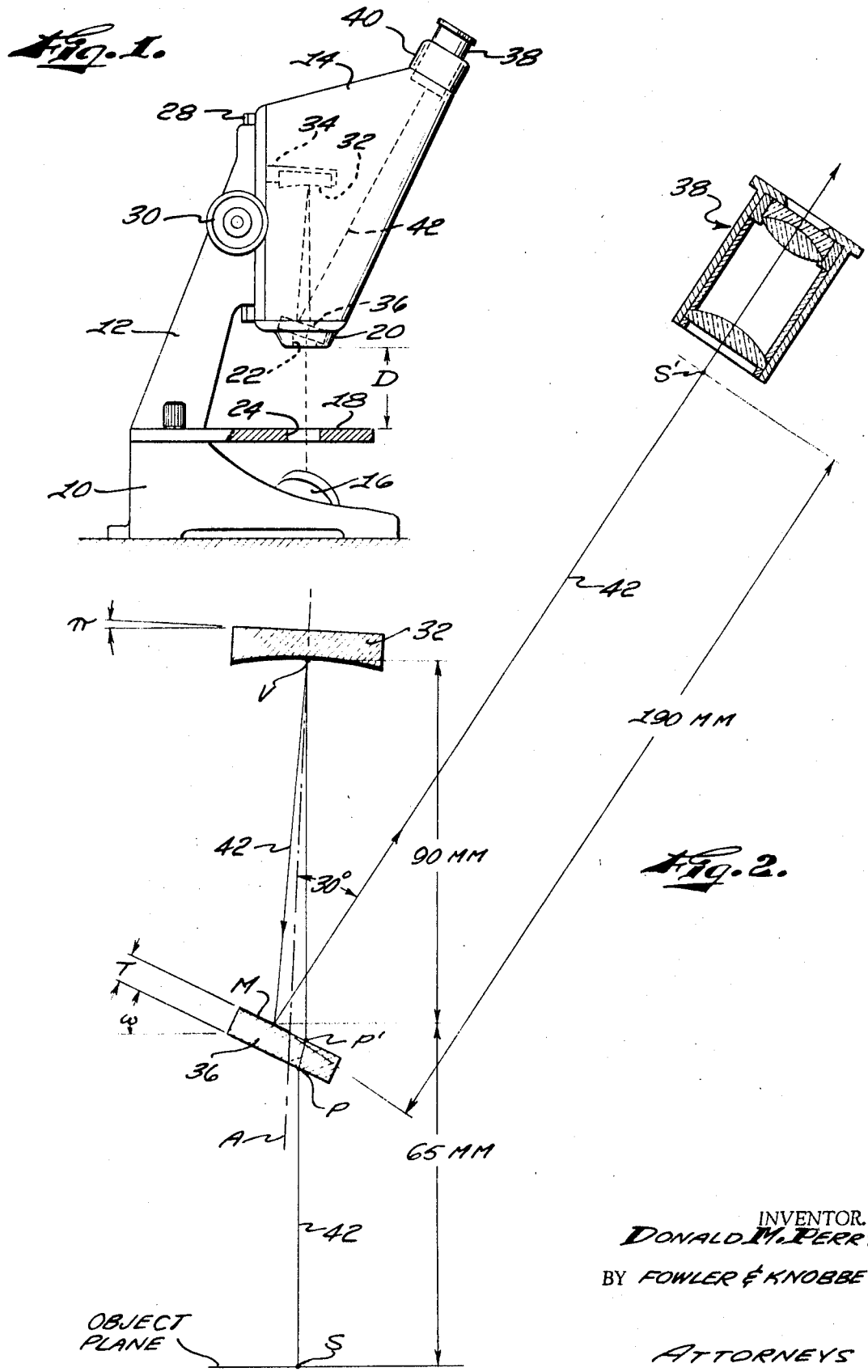

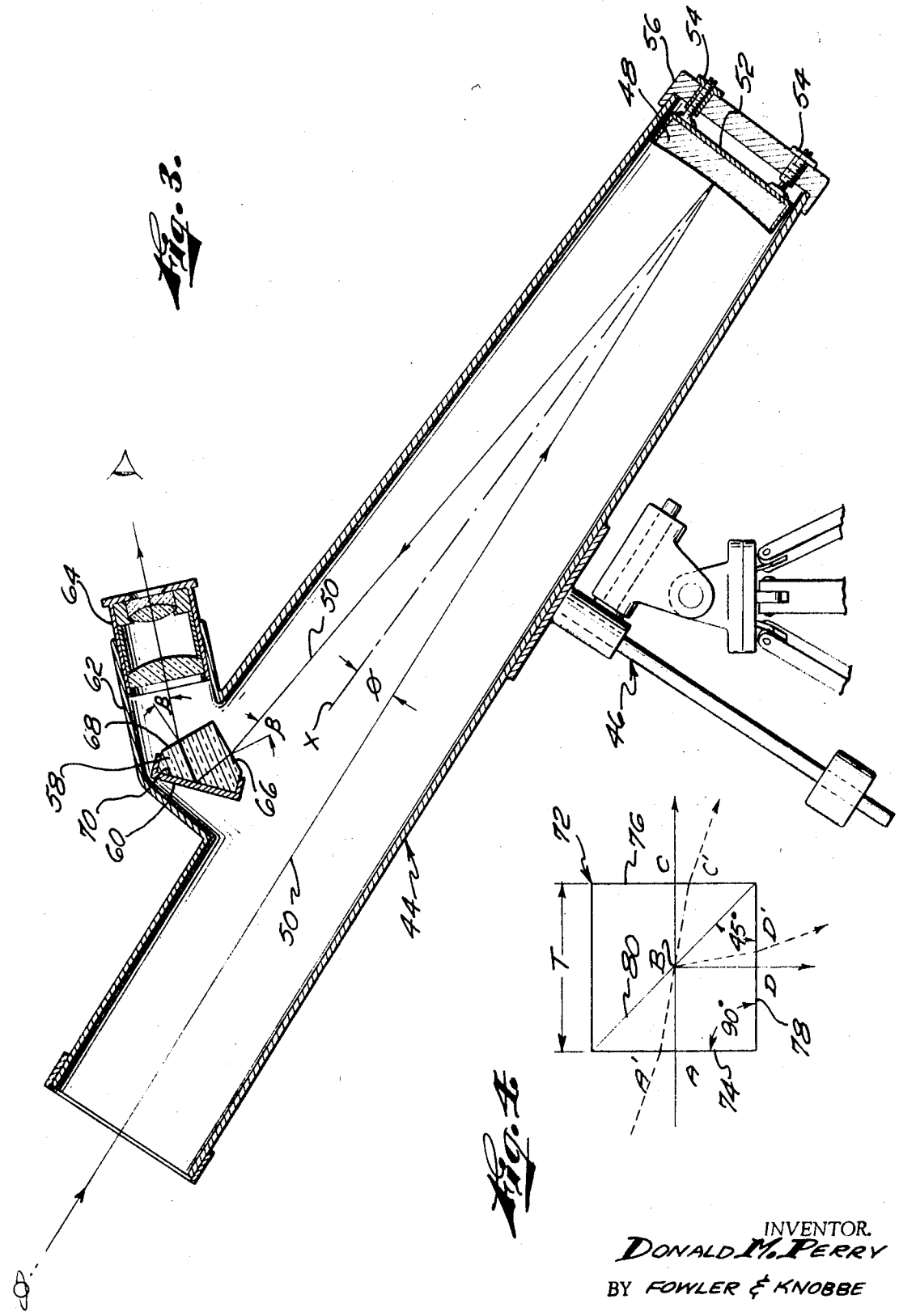

OPTICAL SYSTEM WITH TILTED CONCAVE MIRROR AND ASTIGMATISM COMPENSATOR

This application is a continuation of copending application Ser. No. 781,662, filed Oct. 3, 1968, now abandoned which in turn is a continuation of application Ser. No. 274,149, field Apr. 19, 1963, now abandoned.

This invention relates to the compensated off axis employment of a concave mirror in an image-forming optical system such as in a reflecting microscope, telescope or other optical instrument.

The concave spherical mirror has unique qualities which make it a tempting choice in the design of image-forming optical systems. There is only one simple surface to be ground, yet it exhibits no chromatic aberration and much less spherical aberration than the equivalent single lens of equal aperture and focal length. The trouble with using a concave mirror however is that it is difficult to view an image located on the mirror axis without obstructing the mirror; yet, by tilting the mirror in order to get an easily viewable off-axis image, a serious degree of astigmatic aberration is introduced in the image.

I have discovered a simple and effective way to solve this problem within reasonable limits of operation of an image-forming optical system. In accordance with my invention, an image-forming optical system utilizes a concave mirror which is deliberately tilted so that its axis is at a small angle with the path of the central light ray through the system, in combination with a transparent compensating element serially disposed in the light path at a position in advance of the image location. The compensating element has a plane entrance and exit surface disposed optically parallel and at an angle off of normal with the path of the central light ray, which angle is selected to compensate for astigmatism introduced by the tilt of the mirror.

In accordance with one embodiment of the invention, in a microscope, the combination includes a flat mirror for receiving light rays from a concave spherical mirror and reflecting them toward an eye piece. The compensating element is a transparent plate disposed in a tilted position between the concave spherical mirror and the object plane of the microscope. The plate has plane entrance and exit surfaces, and the flat mirror is formed on and covers part of the exit surface of the plate. This provides an extremely simple and economical construction, and yields a naturally inclined position for the eye piece.

A microscope constructed in accordance with the present invention may employ relatively simple and inexpensive optical parts yet have good magnification, image quality and resolving power as well as a relatively long working distance. This microscope is especially useful as an education microscope for elementary science classes in botany, biology, geology, etc., and as a commercial microscope for inspection, engraving, assembly, etc.

Apparatus constructed in accordance with the present invention, and attendant advantages, will be better understood by referring to the following detailed description taken in conjunction with the accompanying drawings, in which:

FIG. 1 is a side elevation, partly in section, of a reflecting microscope constructed in accordance with the invention;

FIG. 2 is a diagram illustrating the optical system of the microscope of FIG. 1;

FIG. 3 is a sectional elevation of a telescope embodiment of the invention; and, FIG. 4 is a diagram indicating the optical equivalence of a parallel plate and a 45° right prism.

Referring to FIGS. 1 and 2, the microscope has a base 10, a standard 12 extending upward from the base, an optical housing 14 coupled to the standard, a conventional bottom lighting mirror 16 adjustably mounted on the base, and a fixed working table 18 extending horizontally between the optical housing and the bottom lighting mirror for defining an object plane.

The optical housing 14 has a lower fitting 20 in which is defined an entrance aperture 22 for the housing. The apertured lower fitting 20 is vertically aligned with an aperture 24 formed in the working table 18, and with the bottom lighting mirror 16, so that light passes from the bottom lighting mirror through the object plane and to the entrance aperture 22 disposed above and facing the object plane.

The optical housing 14 is slideably engaged on the standard 12 and is movable vertically thereon toward and away from the object plane or table 18 by means of a conventional rack 28 and pinion (not shown) actuated by a knob 30, thus providing focus adjustment.

A concave spherical mirror 32 is fixed within the optical housing on a mounting 34 so that it is disposed above and in alignment with the entrance aperture 22. A tilted transparent plane parallel plate 36 is fixed in the lower fitting 20 of the instrument housing and extends across the entrance aperture 22. A conventional eyepiece 38 is slideably mounted through an upper portion 40 of the optical housing in a conveniently inclined position.

When a conventional glass slide (not shown) is placed on the working table 18, light rays from any object located on the slide pass through the entrance aperture 22, through the tilted plane parallel plate 36 and to the spherical mirror 32. The light rays are reflected downwardly by the spherical mirror 32 to a plane mirror M (best seen in FIG. 2) which in turn reflects the light rays toward the eyepiece 38. The optical system is adjusted so that a real image of an object located within the field of view on the object plane is formed at the eyepiece focal plane. The path of the central light ray through the optical system, or the axis of the optical system, is indicated at 42.

The optical system of the microscope is shown in greater detail and in specific example, in FIG. 2. Here, light emanating from an object S disposed at the center of the field of view on the object plane includes a central light ray 42, the path of which is along the axis of the optical system. The central light ray proceeds upward to strike the plane entrance surface P of the transparent plate 36 where it is refracted and passes to the plane exit surface P' of the plate, where it is again refracted and passes to the vertex V of the spherical mirror 32. The central light ray reflects from the spherical mirror 32 toward a flat mirror M formed as a silvered portion of the exit surface P' of the transparent plate 36. The plane mirror M, being tilted, reflects the light toward the inclined eyepiece 38. As a result of the spherical mirror 32, a real image S' of the object S is formed near the eyepiece 38. The eyepiece provides magnified observation of the image.

As can be seen, the spherical mirror 32 has an axis A which passes through its vertex V. The mirror is tilted so that its axis A is at a small angle $\pi$ with the path of the central light ray 42 which is vertical where it strikes the spherical mirror. The axis A of the spherical mirror intersects the tilted plate 36 at a central point where the flat mirrored portion M of the exit surface P' terminates.

The tilt of the spherical mirror introduces astigmatism; however, the astigmatism is compensated by an opposite astigmatism introduced by the transparent plate 36 when the light passes through its entrance and exit surfaces P, P'.

The entrance and exit plane surfaces P, P' are disposed parallel to one another and at a selected angle $\omega$ off of normal with respect to the path of the incident central light ray 42. The degree of compensating astigmatism introduced by the tilted plate 36 will depend not only upon the angle $\omega$ through which the plate is tilted, but also upon the index of refraction N of the material of the plate and upon the thickness T of the plate.

Standard mirror equations are as follows:

$$\frac{1}{S}+\frac{1}{S'}=\frac{2}{R}=\frac{1}{F} \qquad \text{Equation No. 1}$$

and $$m=\frac{S'}{S}; \qquad \text{Equation No. 2}$$

where S is the distance from the mirror to the object; S' is the distance from the mirror to the image; R is the radius of curvature of the mirror; F is the focal length of the mirror; and $m$ is the magnification.

According to a specific construction of the microscope optical system shown in FIG. 2, the object distance S is 155 mm., the image distance S' is 280 mm., the spherical mirror has a radius R of 200 mm., so that the resulting mirror magnification $m$ is about 1.8. The angle of tilt $\pi$ of the spherical mirror is 20°30'. The angle of tilt $\omega$ of the compensating element or plate 36 is 17° 30' with a plate thickness T of 613 mm. and with the material of the plate being glass having an index of refraction N of 1.519. Under these conditions, the central light ray reflected from the flat mirror portion M of the plate 36 makes an angle of about 30° with the vertical resulting in a convenient natural inclination for the eyepiece 38.

The factors involved in selecting a plane plate 36 for use as a compensating element are severalfold. A standard thickness of commercially available plate glass will suffice for many microscope applications and is a significant economy measure. This selection of course establishes a thickness T of the plate and the index of refraction N of the material. A standard thickness is chosen which will result in some convenient natural slant for the eyepiece 38, and the fine adjustment is made by varying the angle of tilt of the plate $\omega$ until the optimum compensation for astigmatism is made. Of course, the compensation required for a given spherical mirror will depend also upon the angle $\pi$ through which the spherical mirror is tilted. Generally, the angle $\pi$ should be kept as small as possible. Finally, the choice of material for the plate 36 may be dictated by a desire for infrared or ultraviolet photography through the microscope. For example, by substituting a quartz plate in place of the flat glass plate 36, the microscope can be used for certain portions of the ultraviolet spectrum. Other crystal substances may be employed having the characteristic of high transmission in the infrared spectrum. The advantage in the optical system of the invention is that there is no requirement for a shift in focus between visible light and the invisible light.

The magnification obtainable through the spherical mirror can be increased or decreased by suitable variations in the object distance. In the optical system illustrated in FIG. 2, if the object distance S is reduced to 125 mm. then the image distance S' would be 500 mm. and the mirror magnification $m$ would be about 4. It can be seen from the mirror equations that as the object distance S approaches the focal length F of the mirror, the image distance approaches infinity as does the magnification. Hence, the location of the eyepiece approaches infinity. In order to keep the image distance constant, while increasing the power of the microscope, it is necessary to use a shorter radius of curvature for the spherical mirror.

The final magnification obtained by the microscope will be the magnification obtained from the spherical mirror 32 multiplied by the magnification of the eyepiece 38. Conventional eyepieces are available in different powers, for example 10 power, 20 power, etc. A 40 power eyepiece is probably about the practical limit. The optical system as set up in FIG. 2 if used with a 40 power eyepiece, would provide a microscope having a total magnification of about 70.

Referring again to FIG. 1, it will be appreciated that when different slides or other conventional elements (not shown) are placed on the working table 18, the slightly different object distances resulting from different dimensions of the slides or elements will cause the image location to change. Looking through the eyepiece 38, the adjustment knob 30 can be turned to vary the vertical position of the optical housing 14 on the standard 12 so as to adjust the object distance and hence the image location to a position where the image is clearly visible. Further adjustment may be made by sliding the eyepiece slightly forward or back through the upper portion 40 of the instrument housing.

Referring now to FIG. 3, the application of the optical system of the invention to a telescope is illustrated. Here, a telescope having an unobstructed barrel 44 mounted on a conventional telescope mounting 46 is provided with a concave spherical or parabolic mirror 48 which is tilted through a small angle $\theta$ with respect to the path of the incident central light ray 50 through the telescope. The concave mirror 48 is held in a mounting 52 which is in turn supported on adjustment screws 54 mounted through a baseplate 56 which covers the rear end of the telescope barrel 44.

From the concave mirror 48 the path of the central light ray 30 is directed toward a 45° right prism 58, secured in a mounting 60 located within a lateral extension 62 of the barrel 44. From the prism 58 the central light ray 50 is directed to a conventional eyepiece 64, slideably mounted through the outer end of the lateral extension 62.

In the 45° right prism 58, the entrance and exit plane surfaces are constituted respectively by the legs 66, 68 of the prism, and the hypotenuse 70 of the prism acts as an internal mirror, and should be silvered on its outer side if complete critical angle reflection does not occur. The entrance and exit planes 66, 68 of the prism are each tilted through the same angle $\beta$ off of normal with respect to the path of the central light ray 50, so that the prism acts as a compensating element to introduce astigmatism in opposition to the astigmatism introduced by the tilted spherical mirror 48. While a parallel plate may be used in place of the prism 58, the change in direction afforded by the internal reflection of the prism provides a convenient angle for the eyepiece 64. The same design considerations prevail as discussed with respect to the plane parallel plate of the microscope, and once other dimensions and materials are set, the compensation of astigmatism is adjusted by varying the angle $\beta$.

Referring now to FIG. 4, it will be seen that the 45° right prism is optically similar to a plane parallel plate, for use as a compensating element.

A plane parallel plate 72, having a thickness T and a plane entrance surface 74 and plane exit surface 76, may be cut diagonally to form a 45° right prism having a plane entrance surface 74, a plane exit surface 78 and a plane hypotenuse 80. By inspecting the ray paths indicated in solid and dotted line, it can be seen that the 45° right prism is nothing more than a plane parallel plate cut diagonally and the second half replaced by the ray path in the glass after reflection.

A normal ray incident on the entrance surface 74 of the plate will traverse a straight line path ABC. The same ray reflecting off the hypotenuse of the 45° right prism will traverse a path ABD. Paths ABC and ABD are of equal length and make equal angles with the entrance surface 74 and the exit surfaces 76 and 78.

When the plane is tilted, the path through the plate 72 may be represented as A'B C', and the equal path through the prism is A'B D'. By inspection it will be seen that A'B C' equals A'B D' and the angle of emergence of the light rays from the plate exit surface 76 and from the prism exit surface 78 are the same.

Hence, optically speaking, and due to the reflection at the hypotenuse 80, the entrance and exit surfaces or legs 74, 78 of the prism are disposed optically parallel, as are the entrance and exit planes 74, 76 of the plate 72.

In the following claims, unless otherwise specified, the expression "concave mirror" refers to a mirror of conic section, whether it be circular, parabolic or elliptical. The "axis" of the mirror is an imaginary line normal to the surface of the mirror at the center of the mirror.

What I claim is:

1. In an image-forming optical system for a magnifying instrument,
   a concave mirror tilted about a first tilt axis so that its axis is at a predetermined small angle of a few degrees with the path of the central light ray through the system to transmit an image out of the light path of an object to be observed, whereby astigmatism is introduced,
   a single, refracting member having plane, optically parallel, entrance and exit surfaces, the member being positioned in a nonparallel portion of the light path and tilted about a second tilt axis parallel to the first tilt axis to an extent such that the entrance and exit surfaces are disposed off of normal with the path of the central light ray incident on the surfaces of the refracting member by such an angle of tilt and the member having such a predetermined thickness and such a predetermined index of refraction, all correlated to the tilt angle of the concave mirror, to compensate substantially fully for the astigmatism introduced by the tilt of the mirror, and observing means receiving light from the mirror.

2. In an optical instrument for providing magnified observation of objects within its field of view, a concave mirror for producing a real image of an object located within the field of view, the mirror being tilted about a first tilt axis so that its axis is at a small angle of a few degrees with the path of the central light ray through the instrument to transmit the image out of the path of the object, whereby astigmatism is introduced, a single refracting member having a plane entrance surface and a plane exit surface disposed optically parallel with each other, the member being positioned in a nonparallel portion of the light path and tilted about a second tilt axis parallel to the first axis at such a predetermined angle off of normal with the path of the central light ray incident on the surfaces of the member and having such a predetermined thickness and such a predetermined index of refraction relative to the light path of the system, all correlated to the tilt angle of the concave mirror, to compensate substantially fully for the astigmatism introduced by the tilt of the concave mirror, an eyepiece, and means defining a flat mirror for receiving the light from the concave mirror and reflecting it toward the eyepiece.

3. The optical instrument of claim 2 wherein the refracting means is a plane parallel plate.

4. The optical instrument of claim 3 wherein the plane parallel plate has an index of refraction of about 1.519, a thickness of 6.13 mm. and a tilt angle of about 17°30' and a tilt angle of the mirror is about 2°30'.

5. The optical instrument of claim 2 wherein the means defining the flat mirror is a reflective portion of the exit surface of the refracting member.

6. The optical instrument of claim 2 wherein the compensating means is a 45° right prism, with the legs forming the entrance and exit plane surfaces and with the hypotenuse forming the flat mirror.

7. In a reflecting microscope for providing magnified observation of objects within its field of view, an optical housing having an entrance aperture for receiving light rays and a plurality of optical elements mounted in the housing and disposed along the optical axis of the microscope as defined by the central light ray path, the optical elements including a concave spherical mirror facing the entrance aperture and tilted about a first tilt axis so that its axis is at a small, predetermined angle with the central light ray path to deflect an image out of the path of the rays from an object, an inclined eyepiece, a transparent refracting plate of a predetermined thickness and a predetermined index of refraction disposed between the concave mirror and the entrance aperture in a nonparallel portion of the light path so that the light rays pass through the plate prior to reaching the concave mirror, the plate being tilted about a second tilt axis parallel to the first axis at such an angle that plane parallel entrance and exit surfaces of the plate are inclined off of normal with the central light ray path incident on the surfaces of the refracting plate, the thickness, index of refraction and tilt of said plate being correlated to the tilt angle of said concave mirror to compensate substantially fully for astigmatism introduced by the tilt of the concave mirror, and a flat-mirror covering part of the exit surface of the plate for receiving light rays from the concave mirror and reflecting them toward the inclined eyepiece.

8. The microscope of claim 7, wherein the axis of the spherical mirror intersects the exit surface of the plate approximately at the point where the flat mirror terminates.

UNITED STATES PATENT OFFICE
CERTIFICATE OF CORRECTION

Patent No. 3,598,468     Dated August 10, 1971

Inventor(s)     DONALD M. PERRY

It is certified that error appears in the above-identified patent and that said Letters Patent are hereby corrected as shown below:

Column 1, line 5, change "field" to --filed--

Column 3, line 10, change "20°30'" to --2° 30'--

Column 5, line 3, change "hat" to --that--

Signed and sealed this 25th day of January 1972.

(SEAL)
Attest:

EDWARD M. FLETCHER, JR.
Attesting Officer

ROBERT GOTTSCHALK
Commissioner of Patents